United States Patent [19]
Fujii et al.

[11] 3,883,519
[45] May 13, 1975

[54] METHOD FOR PURIFICATION OF CEPHALEXIN

[75] Inventors: Shoichiro Fujii, Kyoto; Kunio Takanohashi, Toyonaka, both of Japan

[73] Assignee: Takeda Chemical Industries, Ltd., Osaka, Japan

[22] Filed: Dec. 1, 1972

[21] Appl. No.: 311,430

[30] Foreign Application Priority Data
Dec. 4, 1971 Japan.................................. 46-97979
Apr. 21, 1972 Japan.................................. 47-40676

[52] U.S. Cl............ 260/243 C; 424/246; 195/36 P; 195/80 R
[51] Int. Cl............................................ C07d 99/24
[58] Field of Search................................ 260/243 C

[56] References Cited
UNITED STATES PATENTS

| 3,634,416 | 1/1972 | Schofield | 260/243 C |
| 3,634,417 | 1/1972 | Attenburrow | 260/243 C |
| 3,655,656 | 4/1972 | VanHeyningen | 260/243 C |
| 3,676,434 | 7/1972 | Massey | 260/243 C |
| 3,687,947 | 8/1972 | Debono | 260/243 C |
| 3,692,781 | 9/1972 | Oughton | 260/243 C |
| 3,728,341 | 4/1973 | Crisp et al. | 260/243 C |

Primary Examiner—Nicholas S. Rizzo
Attorney, Agent, or Firm—Wenderoth, Lind & Ponack

[57] ABSTRACT

Cephalexin is purified by allowing it to precipitate as a sparingly soluble salt with a base such as a nitrogen-containing heterocyclic compound (e.g. quinoline, isoquinoline) or an aniline or naphthylamine compound (e.g. dichloroaniline, α-naphthylamine), separating the salt and decomposing the salt.

21 Claims, No Drawings

METHOD FOR PURIFICATION OF CEPHALEXIN

The present invention relates to a method for the purification of cephalexin and to the intermediates utilised therein.

Cephalexin is one of the most valuable antibiotics, but it contains an amino group in its side chain acyl moiety and a carboxyl group in the 4-position, and, accordingly, forms zwitter ions in aqueous solutions. Therefore, these derivatives have a strong affinity for aqueous solutions, which makes it extremely difficult to isolate and purify these compounds. Further, when cephalexin is prepared by chemical or biological acylation of 7-amino-3-desacetoxycephalosporanic acid (this compound may be referred to briefly as "7-ADCA"), the solution contains the starting materials and their degradation compounds, e.g. 7-ADCA, phenylglycine, etc. and the co-existence of these impurities prevents the purification of cephalexin, e.g. by disturbing the precipitation at its isoelectric point. Thus, much difficulty has been experienced in preparing cephalexin in good yield and purity.

Penicillin salts afford no guidelines with regard to solubility, since there is no direct correlation between salt of penicillin and those of cephalosporin antibiotics. For example, procaine forms a water insoluble salt of penicillin G, but not with cephalothin. Ampicillin, a penicillin which has an amino group in its side-chain acyl group, is known to react with such reagents as $\beta$-naphthalene-sulfonic acid or diphenylsulfonic acid to give salts which are only sparingly soluble in water and means are also known for isolating ampicillin by taking advantage of this reaction. However, cephalexin to which this invention is directed cannot be precipitated even with these sulfonic acids.

Recently, it has been reported that benzylamine or collidine forms a sparlingly insoluble salt with cephalosporin derivatives having a 7$\alpha$-protected aminoarylacetamido side-chain (U.S. Pat. No. 3,634,417=British Pat. No. 1,265,315=J.P. Publication No. 14117/'72), but such amines cannot precipitate cephalexin of which $\alpha$-amino group in the side-chain is not protected.

Under the circumstances we conducted an intensive study and ultimately discovered, to our own surprise, cephalexin is capable of forming salts which are sparingly soluble in water and organic solvents (e.g. acetone, ether, ethyl acetate, chloroform, etc.) with a nitrogen-containing heterocyclic compound which has a pK value of $10^{-9}$ to $10^{-11}$ or with an aniline or naphthylamine compound (exclusive of aniline; hereinafter referred to also as aromatic amine (I), while other impurities remain soluble.

The formation of such a sparingly soluble salt is quite surprising in view of the fact that the carboxyl group of such an aminocephalosporin is very weak as an acid function while the basicity of the above-mentioned nitrogen-containing heterocyclic compound or aromatic amine (I) is also weak.

The cephalexin salts possess the advantages that they can be formed in the last step of the formation of cephalexin, and that they can be recovered in a well-defined crystalline form from which the desired end product: i.e. cephalexin can be obtained in high purity for a pharmaceutical use and in good yield.

The nitrogen-containing heterocyclic compound which has a pK value of $10^{-9}$ to $10^{-11}$ is preferably one whose solubility in water is not more than 1 percent and, while it may contain from 1 to 3 nitrogen atoms as hetero-atoms, it preferably should not contain hetero-atoms other than nitrogen in the hetero-ring. And its molecular weight preferably falls within the range of 129 to 170. Examples of such nitrogen-containing heterocyclic compound include compounds which have such nuclei as quinoline, isoquinoline, quinoxaline, etc. and may have such substituents as alkyl groups (methyl, ethyl, etc), halogens (e.g. chlorine, bromine, etc.), hydroxyl, amino and the like. In these nitrogen-containing heterocyclic compounds, preferable ones may be illustrated by the formula:

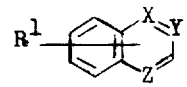

wherein $R^1$ represents hydrogen of hydroxyl or a lower alkyl group and each of X, Y and Z represents nitrogen or carbon and at least one of X, Y and Z is nitrogen. More particularly, one may employ such compounds as quinoline, isoquinoline, 2-methylquinoline, 4-methylquinoline. 6methylquinoline, 8-methylquinoline, 2-chloroquinoline, 6-chloroquinoline, 8-chloroquinoline, 2-hydroxyquinoline, 8-hydroxyquinoline, 8-hydroxyquinoxaline, quinoxaline and the like.

Referring to aromatic amines (I), the lower alkyl substituents may be methyl, ethyl, isopropyl, etc., and each compound may have an optional number of such lower alkyl groups or/and chlorine in optional positions. More preferable ones may be represented by the formula:

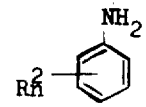

wherein $R^2$ stands for chlorine or a lower alkyl group and n is an integral number of 1 or 2 or $R_n^2$ represents a group $-CH=CH-CH=CH-$. For example, 2-chloroaniline, 3-chloroaniline, 2,6-dichloroaniline, 2,3-dimethylaniline, 2,5-dimethylaniline, $\beta$-naphthylamine, $\beta$-naphthylamine, etc. may be mentioned.

Formation of the salts is carried out by allowing a nitrogen-containing heterocyclic compound which has a pK value of $10^{-9}$ to $10^{-11}$ or an aromatic amine (I) to act upon a solution containing cephalexin. In this reaction, cephalexin is precipitated as crystals which are only sparingly soluble in water and organic solvents, while the unreacted 7-ADCA or phenylglycine, for instance, does not form a salt. Therefore, the desired compound can be easily isolated from the reaction mixture by filtration or centrifugation, etc. This reaction is preferably carried out in water or an aqueous medium which is a mixture of water with hydrophilic solvents such as methanol, ethanol, isopropanol, acetonitrile, acetone, methyl ethyl ketone, ethyl acetate, etc. The production of such a sparingly soluble salt of aminocephalosporin is favored at room temperature (2-0°–30°C) or under cooling and when the pH of the system is between 4.0 and 7.0. The best result is attained when the pH is in the neighborhood of 4.5. The concentration of cephalexin in the aqueous solution may range from 0.1 to 20 percent and, preferably, between 2 and 5 percent. The proportion of the heterocyclic compound or aromatic amine (I) is one to 4 molar equivalents with respect to the cephalexin to be purified, the preferred proportion being from abut 1.5 to 2.5 equivalents. Generally, the reaction mixture is cooled and allowed to stand long enough for the salts to crystallize fully. Conventional methods of assisting crystallization may be employed when necessary. The salts are separated from the mother liquor e.g. by filtration or centrifugation, followed by washing with a suitable solvent, water, acetone, etc.

Physicochemical determinations using such techniques as paper electrophoresis, thin-layer chromatography, NMR, UV, IR, etc. have shown that the sparingly soluble crystalline salt obtainable in the foregoing manner is highly pure.

The cephalexin-containing solution to be employed for the production of such cephalexin salts may be any of the reaction mixtures of the chemical, enzymic or biological acylation of 7ADCA. In these acylation processes, when an ester of 7-ADCA is employed, the salt formation is conducted at the same time or after the liberation of the carboxylic group. The reaction mixture obtainable by a chemical acylation process may be the reaction mixture which can be obtained by reacting 7-ADCA with a bifunctional silenating agent such as dimethyldichlorosilane or dimethoxydichlorosilane to obtain the corresponding silene polymer and, then, acylating the same polymer with phenylglycine. This acylation reaction may of course be conducted in the conventional manner using a reactive derivative of phenylglycine such as the acid halide, anhydride, active ester or amide or, alternatively, the presence of a suitable condensing agent. It is necessary that the amino group be previously protected with a porton or a protective group which can subsequently be removed under conditions which will not disrupt the cephalosporin nucleus. The reaction mixture obtainable by an enzymic process, for example, the aqueous solution obtained from a D-phenylglycine ester and 7-ADCA with the aid of the washed cells of a certain microorganism such as *Xanthomonas oryzae* can also be used.

The sparingly soluble salts thus obtained can then be decomposed to the corresponding free compound; i.e. cephalexin or to the corresponding salt of, say, sodium, potassium or magnesium salt of cephalexin. To decompose the salt, one may for example dissolve, it in an acidic aqueous solution and, then increase the pH of the solution to the isoelectric point (pH 4.5) of the cephalexin with a suitable base, the procedure giving rise to crystals of the cephalexin. In this connection, the concomitant presence of a water-soluble solvent such as methanol, ethanol, isopropanol or acetonitrile enhances the yield of the desired compound. Another preferred method of decomposing the salts comprises acidifying the salts with an aqueous acid and extracting the desired product into an organic solvent such as ethyl acetate or methyl isobutyl ketone. An acid addition salt of the base remains in the aqueous phase. Suitable acids include strong mineral acids, e.g. hydrochloric acid, sulfuric acid, and so on.

Alternatively, one may suspend the sparingly soluble cephalexin salt in water, alkalinize the suspension with an alkali such as sodium hydroxide and wash it with a solvent, such as ether, in which the heterocyclic compound or aromatic amine (I) is soluble. This procedure yields the corresponding alkali salt of the aminocephalosporin. An alkali salt of cephalexin may also be obtained by preparing an aqueous suspension of the cephalexin which has separated out at the isoelectric point, alkalinizing the suspension with an alkali (to about pH 5.7) and finally concentrating the solution.

The crystallization and isolation of the salts substantially eliminate starting materials and byproducts formed earlier in the overall process.

It is to be understood that the following examples are solely for the purpose of illustration and not to be construed as limitations of this invention, and that many variations may be resorted to without departing from the spirit and scope of this invention. In this specification, "g.", "mg.", "ml.", "$\mu$l.", "cm", and "m$\mu$" are "gram", "milligram", "milliliter", "microliter", "centimeter" and "millimicron", respectively. Temperatures are all uncorrected, and percentages are all on the weight basis.

EXAMPLE 1

In 200 ml. of dichloromethane is suspended 4 g. of 7-ADCA and, under cooling, 4.5 g. of triethylamine is added. Then, at 8°C, 2.8 ml. of dimethyldichlorosilane is added dropwise over about 20 minutes, whereby the 7-ADCA is silenated to give a substantially homogeneous solution. This reaction mixture is recooled and at a temperature of not higher than 0°C, 3.0 g. of dimethylaniline is added. Then, 5.0 g. of D(−) phenylglycyl chloride hydrochloride is added in small installments over about 40 minutes. At a temperature within the range of 0°–5°C, the mixture, is stirred for 3 hours to complete the reaction. The reaction mixture is poured into 200 ml. of ice-water, followed by vigorous stirring. Under cooling, a 30% aqueous solution of sodium hydroxide is added to the mixture until the pH reaches 7.0, after which time the insolubles are filtered off. Chloroform is added to the filtrate and the mixture is allowed to separate into a water layer and an organic layer. The water layer is concentrated to about 100 ml. and the pH is readjusted to 5.7. Then, at room temperature, 4ml. of quinoline is added dropwise. Upon the addition of quinoline, the quinoline salt of cephalexin immediately separates out. After the entire amount of quinoline has been added, the mixture is stirred under cooling with ice for 1 hour and, then, the resulting crystals are recovered by filtration, washed with a small amount of water and dehydrated. Yield 8.2 g. (92.3% as quinoline salt).

When these crystals are subjected to paper electrophoresis, there is detected only a spot corresponding to that of an authentic sample of cephalexin, there being observed no spots suggestive of the starting material 7-ADCA and phenylglycine. The NMR spectrum of the crystals show chemical shifts identical with those of authentic samples of cephalexin and quinoline, and the IR spectrum (Nujol) indicates the existence of the lactam ring (1750cm$^{-1}$).

Then, the above salt (8.2 g.) is dissolved in 10 ml. of 2N-hydrochloric acid, followed by the addition of 60 ml. methanol. Under cooling, the mixture is adjusted to pH 4.3 with 20% sodium hydroxide. When the pH reaches about 3.5, cephalexin starts separating out. After the pH is brought to about 4.3, the mixture is stirred under cooling for 1 hour and the resulting crystals are recovered by filtration. The crystals are washed with a small amount of water and dried. Yield 5.5 g. (80.5% based on 7-ADCA).

The NMR, IR and UV spectra of this product are completely identical with the corresponding spectra of an authentic sample of cephalexin.

EXAMPLE 2

In 150 ml of methylene chloride is suspended 3 g. of 7-ADCA and, under cooling, 3 g. of triethylamine is added. Then, at about 8°C, dimethyldichlorosilane is added dropwise. After the dropwise addition has been completed, the mixture is stirred at 40°C for 1 hour. Under cooling, dimethylaniline is added and, then, 3.5 g. of D(−) phenylglycyl chloride hydrochloride is added. Thereafter, the procedure of Example 1 is followed. Upon addition of 1.8 ml, quinoline, there is obtained 5.6 g. of the quinoline salt of cephalexin (85%).

A 0.5 g. portion of the above quinoline salt is dissolved in 1 ml. of 2N-HCl, followed by the addition of 10 ml. acetonitrile. Under cooling, 30% NaOH is added dropwise until the pH reaches 4.3–4.5, and the resulting crystals are recovered by filtration. Yield 0.32 g. (83.5%). The IR and NMR spectra of this product are identical with the corresponding spectra of an authentic sample of cephalexin. Absorption maximum: 258mμ (0.01N-HCL); ($\alpha$) $_D^{water}$ =137°.

EXAMPLE 3

In 60 ml. of dichloromethane is suspended 1 g. of 7-ADCA and, under cooling, 1 g. of triethylamine is added. In the neighborhood of 8°C, dimethyldichlorosilane is added and the mixture is heated at 40°C for 1 hour. Under cooling, 0.6 ml. of quinoline is added, followed by the addition of 1.2 g. of D(−) phenylglycycyl chloride hydrochloride. The mixture is stirred at a temperature not in excess of 10°C for 3 hours to complete the reaction. The reaction mixture is poured in 50 ml. of ice-water and the solution is adjusted to pH 2 with 30% NaOH. The mixture is allowed to separate into a dichloromethane layer and a water layer. The water layer is taken and adjusted to pH 6 with 30% NaOH, whereupon cephalexin quinoline salt separates out. Yield 2.0 g. This salt is dissolved in 4 ml. of 2N-HCl, followed by the addition of 40 ml. ethanol. The mixture is brought to pH 4.5 with 40% NaOH, whereby cephalexin is precipitated. Under cooling, the mixture is stirred for 1 hour and, then, the crystals are recovered by filtration. Yield 1.3 g. (76.0% based on 7-ADCA).

EXAMPLE 4

In 15 ml of 2N-HCl is dissolved 5.5 g. of the cephalexin quinoline salt which has been obtained by the silene process, followed by the addition of 100 ml. acetonitrile. As 30% NaOH is added dropwise under cooling, crystals gradually separate. The pH of the aqueous solution is brought to 4.3 and 60 ml. of acetonitrile is further added. Meanwhile the pH of the aqueous solution is held in the neighborhood of 4.3. The solution is further stirred under cooling with ice for 2 hours, after which time the crystals are recovered by filtration. Yield 3.7 g. (87.7%). The NMR and IR spectra of this product are identical with the corresponding spectra of an authentic sample of cephalexin. Absorption maximum: 258mμ (0.01N-HCl).

EXAMPLE 5

Twenty ml. of a culture medium (pH 7.0 composed of 2.0% sucrose, 0.2% sodium glutamate, 0.2% yeast extract, 0.5% polypeptone, 0.2% dipotassium hydrogen phosphate, 0.01% ferrous sulfate and 0.1% magnesium chloride is inoculated with a loopful of *Xanthomonas oryzae* IFO-3510 and the inoculated medium is incubated at 28°C under shaking for 1 hour. The resulting culture is transferrd to the same medium as above (500 ml.) in shake-flask of 2 liters capacity. The shake culture is conducted at 28°C for 20 hours and the cells are collected by centrifugation and suspended in 50 ml. of 0.05 M phosphate buffer. To this suspension is added 50 ml. of a 0.1M-$K_2HPO_4$ solution containing 4% of D-phenylglycine methyl ester and 2% of 7-amino-3-desacetoxycephalosporanic acid (adjusted to pH 6.0 with 2N-HCl). Under shaking, the mixture is reacted at 37°C for 50 minutes. It is found by bioautography that 1.28 g. of cephalexin has accumulated in the reaction mixture. The cells are immediately removed by centrifugation and 1.5 ml. of quinoline is added to the supernatant. The mixture is stirred well at 37°C for 5 minutes, after which time it is cooled with ice and allowed to stand for 30 minutes. The resulting crystals are recovered by filtration and dried, whereupon 1.5 g of cephalexin quinoline salt is obtained. (Yield 86.0%). These crystals are identified as cephalexin quinoline salt by physicochemical determinations including paper electrophoresis, NMR, IR and so forth.

EXAMPLE 6

In 60 ml of dichloromethane is suspended 1 g. of 7-ADCA and, under cooling, 1 g. of triethylamine is added. Then, 0.6 ml of dimethyldichlorosilane is added in the neighborhood of 80°C and the mixture is refluxed at 40°C for 1 hour. The mixture is cooled to a temperature not exceeding 0°C, and 0.6 g. of N,N-dimethylaniline and 1.2 g. of D(−) phenylglycyl chloride hydrochloride are added. The mixture is stirred at a temperature not in excess of 10°C for 3 hours. The reaction mixture is poured into 50 ml. of ice-water and, under cooling with ice, the mixture is adjusted to pH 7 with 40% sodium hydroxide. The insolubles are filtered off and the filtrate is washed with chloroform. The water layer is adjusted to pH 5.7 and 1 ml. of isoquinoline is added dropwise at room temperature, whereupon cephalexin isoquinoline salt separates out. After cooling with ice, the crystals are recovered by filtration. Yield 2.0 g. (89.4%).

EXAMPLE 7

In 10ml. of water is dissolved 100 mg. of cephalexin sodium salt (pH about 7.0) and a solution of 47 mg. α-naphthylamine in 80 μl. methanol is added to the solution.

The mixture is stirred at room temperature for 30 minutes and, then, cooled with ice for 3 hours. The resulting precipitate is recovered by filtration and washed with a small volume of ether, whereupon 125 mg. (90%) of cephalexin α-naphthylamine salt is obtained. This product melts at 142°–145°C(decomp.) and, in the infrared region of the spectrum, shows an absorption of the lactam at 174cm$^{-1}$ (Nujol). The nuclear magnetic resonance spectrum (trifluoroacetic acid, 100 megacycles) of the product shows resonances assignable to cephalexin and to α-naphthylamine.

In 1.5 ml. of 2N-hydrochloric acid is dissolved 1 g. of the cephalexin α-naphthylamine salt and, then, 10 ml. of methanol is added. Under cooling, the pH of the solution is raised by the addition of a 15% aqueous solution of sodium hydroxide. Cephalexin starts separating out when the pH is about 3.5. Finally, at pH 4.3, the mixture is stirred under cooling with ice for 1 hour. The crystals are recovered by filtration and washed first with a small amount of methanol and, then, with water. The procedure yields 0.6 g. (yield β 1%) of cephalexin.

By ultraviolet absorption and nuclear magnetic resonance spectrometry, bioautography and other assay methods, this product is found to be completely identical with an authentic sample of cephalexin.

α-Naphthylamine is added to a 1% aqueous solution of the sodium salt of phenylglycine, 7-aminocephalosporanic acid or 7-aminodesacetoxycephalosporanic acid. In each instance, no precipitation whatever of the corresponding salt is observed.

EXAMPLE 8

In 10 ml. of water is dissolved 100 mg. of cephalexin sodium salt, followed by the addition of 52 mg. of 2-chloroaniline. The mixture is stirred at room temperature for 1 hour and, then, cooled with ice for 1 hour. The resulting precipitate is recovered by filtration and washed with a small volume of ether, whereupon 88 mg. of cephalexin 2-chloroaniline salt is obtained. This product melts at 177°–179°C(decomp.) and, in the infrared region of the spectrum, shows an absorption of the lactam at 1760cm$^{-1}$ (Nujol). The nuclear magnetic resonance spectrum (trifluoroacetic acid, 100 megacycles) of the product shows resonances assignable to cephelexin and to 2-chloroaniline.

Elementary analysis: Calculated for $C_{22}H_{23}O_4N_4SCl.3H_2O$; C, 49.95; H. 5.53; N. 10.59. Found; C, 50,85; H, 5.10; N, 10.17. 2-chloroaniline is added to a 1% aqueous solution of the sodium salt of phenylglycine, 7-aminocephalosporanic acid or 7-aminodesacetoxycephalosporanic acid. In each instance, no precipitation whatever of the corresponding salt is observed.

EXAMPLE 9

Under the same conditions as those described in Example 7, the following amines are reacted with cephalexin. The lactam absorptions of the resulting salts in the infrared region of the spectrum (Nujol) are given in the following table.

| Amine | Lactam absorption(cm$^{-1}$) |
| --- | --- |
| 3-Chloroaniline | 1770 |
| 2,6-Dichloroaniline | 1740 |
| 2,3-Dimethylaniline | 1760 |
| 2,5-Dimethylaniline | 1740 |

The nuclear magnetic resonance spectra (trifluoroacetic acid, 10 megacycles) of these salts show resonances assignable to cephalexin and the corresponding amines.

EXAMPLE 10

Using 1% aqueous solutions of cephalexin sodium salt (which contain 100 mg. of cephalexin each) and varying the mole ratio of α-naphthylamine to cephalexin and the pH of the aqueous solutions prior to the additin of a α-naphthylamine, the influences of these variables upon the yield of the α-naphthylamine salt are evaluated. The results are set forth in the following table.

| α-Naphthylamine (mole ratio) pH | 1 | 2 | 3 |
| --- | --- | --- | --- |
| 5 | 110(78) | 118(83) | 121(86) |
| 6 | 113(80) | 125(89) | 125(89) |
| 7 | 114(81) | 126(89) | 127(90) |

In the table, unparenthetized values are in milligrams; values in parentheses are percent yields.

Example 11

In 30 ml of chloroform is dissolved 185 mg. of tributylamine and, then, 214 mg. of 7-aminodesacetoxycephalosporanic acid is dissolved. To this solution is added 121 mg. of N,N-dimethylaniline and the mixture is cooled to 5°–10°C. Then, 207 mg. of D-phenylglycyl chloride hydrochloride is added over 10 minutes, after which time the mixture is stirred at 5°–10°C for 1 hour and, then, at 10°–15°C for 2 hours. The reaction mixture is extracted twice with 10 ml. portions of a 5% aqueous solution of sodium hydrogen carbonate and, after the extract is adjusted to pH 6.5, a solution of 143 mg. α-naphthylamine in 200 μl. of methanol is added. The mixture is stirred at room temperture for 1 hour and, then, cooled with ice for 5 hours. The precipitate is recovered by filtration, whereupon 230 mg. of cephalexin α-naphthylamine salt is obtained.

EXAMPLE 12

To an aqueous solution (50 ml.) containing 373 mg. 7-aminodesacetoxycephalosporanic acid and 740 mg. D-phenylglycine methyl ester, there are added the cells of *Xanthomonas oryzae* IFO-3510 obtained in Example 5. The system is allowed to react at 37°C for 50 minutes. The result of a bioautographic assay shows that the reaction mixture contains 570 mg. of accumulated cephalexin. The cells are removed by centrifugation and the supernatant is adjusted to pH 7.0. Then, a solution of 700 mg. α-naphthylamine in 1 ml. methanol is added, followed by stirring at room temperature for 1 hour. The solution is then allowed to stand in a refrigerator overnight. Next, morning, the precipitate is recovered by filtration to obtain 724 mg. of cephalexin α-naphthylamine salt.

EXAMPLE 13

An aqueous solution (92 ml.) of a cephalexin sample which has been obtained by the silene process (which solution contains 5.65 g. of cephalexin) is adjusted to pH 5.5 and, then, a solution of 2.3 g. α-naphthylamine in 4 ml. acetone is added in small installments. After the addition is completed, the mixture is further stirred, whereupon crystals separate out. The crystals are recovered by filtration, washed with acetone-ether and dried under reduced pressure. The procedure yields 5.6 g. of cephalexin α-naphthylamine salt. (Yield 88.5%). This α-naphthylamine salt is identified by IR, NMR and TLC assays. The salt is suspended in 60 ml. of water and, under cooling with ice, the suspension is brought to pH 10.0 with 40% NaOH, followed by washing with 3 portions of ether. The aqueous layer is brought to pH 4.5, whereupon crystals of cephalexin separate. Yield 3.4 g. (Yield from aqueous solution: 75%). By NMR IR, UV, TLC and X-ray diffraction assays, this product is identified with an authentic sample of cephalexin monohydrate.

EXAMPLE 14

An aqueous solution (10 ml.) of a cephalexin sample which has been prepared by the silene process (which solution contains 1.2 g. of cephalexin) is adjusted to pH 5.5 and 0.6 ml. of 2-methylquinoline (quinldine) is added dropwise, whereupon crystals separate out. After cooling, the crystals are recovered by filtration. Yield 1.0 g. by IR, NMR and TLC assays, these crystals are identified with cephalexin 2-methylquinoline salt.

EXAMPLE 15

Quinoxaline is added to an aqueous solution of cephalexin which has been obtained by a procedure similar to that mentioned in Example 14, whereupon needles of cephalexin quinoxaline salt are obtained.

EXAMPLE 16

In 200 ml. of methylene chloride, there are added 7-(α-methylthiophenethylidene)amine-3-desacetoxycephalosporanic acid β-methylsulfonylethyl ester (7.4 g.) and D-N-(β-methylsulfonylethoxycarbonyl)phenylglycyl chloride (6.1 g.), followed by the addition of 20 ml. of water. The mixture is stirred at room temperature for 5 hours, at the end of which time it is washed with an aqueous solution of sodium bicarbonate and water, dehydrated and concentrated. The procedure yields a crystalline powder.

The powder is suspended in 300 ml. of water and while cooling with ice and stirring, 1N-sodium hydroxide is added dropwise to adjust its pH to 11. The stirring is continued for half an hour, at 11. end of which time the solution is adjusted to pH 5.5. Then, a solution of 2.7 g. α-napthylamine in 3 ml. acetone is added dropwise, whereupon cephalexin α-naphthylamine salt separates. The crystals are recovered by filtration, washed with acetone-ether and dried. Yield 5.21 g. (80%).

This α-naphthylamine salt (5.21 g.) is suspended in 50 ml. of water and, under cooling, the pH is brought to 10.8. The solution is washed three times with 30 ml. each of ethyl acetate to remove α-naphthylamine. The aqueous layer is brought to pH 1.8 with and decolorized with carbon powder. The decolorized filtrate is adjusted to pH 4.5, whereupon crystals of cephalexin are obtained. The crystals are recovered by filtration. Yield: 3.3 g. or 85% from the α-naphthylamine salt.

What we claim is:

1. A process for producing a sparingly soluble salt of cephalexin, wherein cephalexin is reacted with a base selected from the group consisting of a compound of the formula

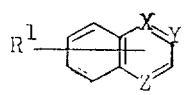

wherein $R^1$ represents hydrogen, hydroxyl, methyl or ethyl, each of X, Y and Z represents nitrogen or carbon and at least one of X, Y and Z is nigtrogen, with the proviso that all of X, y and Z do not represent nitrogen at the same time, and a compound of the formula

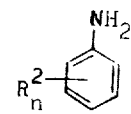

wherein $R^2$ represents chlorine or alkyl of 1 to 3 carbon atoms and n is an integer of 1 or 2, or $R_n^2$ represents the group —CH=CH—CH=CH—.

2. A method for the purification of cephalexin, which comprises admixing a solution containing the cephalexin with a base selected from the group consisting of a compound of the formula

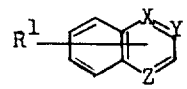

wherein $R^1$ represents hydrogen, hydroxyl, methyl or ethyl, each of X, Y and Z represents nitrogen or carbon and at least one of X, Y and Z is nitrogen, with the proviso that all of X, Y and Z do not represent nitrogen at the same time, and a compound of the formula

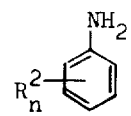

wherein $R^2$ represents chlorine or alkyl of 1 to 3 carbon atoms and n is an integer of 1 or 2, or $R_n^2$ represents the group —CH=CH—CH=CH—, thus precipitating a sparingly soluble salt of the cephalexin with the base, isolating the resultant sparingly soluble salt and decomposing the salt.

3. In a method for producing cephalexin wherein a reaction product of 7-amino-3-desacetoxy cephalosporanic acid with dimethyldichlorosilane or dimethoxydichlorosilane is reacted with phenylglycylchloride hydrochloride in an anhydrous organic solvent and the resultant product is hydrolyzed, the improvement wherein a solution of the cephalexin thus obtained is admixed with a base selected from the group consisting of a compound of the formula

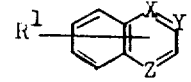

wherein $R^1$ represents hydrogen, hydroxyl, methyl or ethyl, each of X, Y and Z represents nitrogen or carbon and at least one of X, Y and Z is nitrogen, with the proviso that all of X, Y and Z do not represent nitrogen at the same time, and a compound of the formula

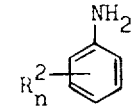

wherein $R^2$ represents chlorine or alkyl of 1 to 3 carbon atoms and n is an integer of 1 or 2, or $R_n^2$ represents the group —CH=CH—CH=CH—, thus precipitating a sparingly soluble salt of the cephalexin with the base, and the salt is isolated and decomposed.

4. In a method for producing cephalexin wherein 7-amino-3-desacetoxycephalosporanic acid β-methylsulfonylethyl ester is reacted with phenylglycylchloride hydrochloride in an anhydrous organic solvent and the resultant product is hydrolyzed, the improvement wherein a solution of the cephalexin thus obtained is admixed with a base selected from the group consisting of a compound of the formula

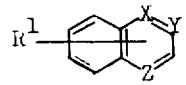

wherein $R^1$ represents hydrogen, hydroxy, methyl or ethyl, each of X, Y and Z represents nitrogen or carbon and at least one of X, Y and Z is nitrogen, with the proviso that all of X, Y and Z do not represent nitrogen at the same time, and a compound of the formula

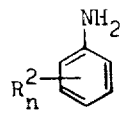

wherein $R^2$ represents chlorine or alkyl of 1 to 3 carbon atoms and n is an integer of 1 or 2, or $R_n^2$ represents the group —CH=CH—CH=CH—, thus precipitating a sparingly soluble salt of the cephalexin with the base, and the salt is isolated and decomposed.

5. A process according to claim 1, wherein the base is selected from the group consisting of quinoline, isoquinoline and naphthylamine.

6. A process according to claim 1, wherein the base is quinoline.

7. A process according to claim 1, wherein the base is isoquinoline.

8. A process according to claim 1, wherein the base is a naphthylamine.

9. A process according to claim 8, wherein the naphthylamine is α-naphthylamine.

10. A process according to claim 8, wherein the naphthylamine is β-naphthylamine.

11. A method according to claim 2, wherein the solution containing a cephalexin is a reaction mixture of 7-amino-3-desacetoxycephalosporanic acid and phenylglycylchloride hydrochloride.

12. A method according to claim 2, wherein the decomposition of the sparingly soluble salt is conducted by dissolving the salt in an acid aqueous solution and increasing the pH of the solution to about the isoelectric point of cephalexin.

13. A method according to claim 2, wherein the base is selected from the group consisting of quinoline, isoquinoline and naphthylamine.

14. A method according to claim 2, wherein the base is quinoline.

15. A method according to claim 2, wherein the base is isoquinoline.

16. A method according to claim 2, wherein the base is a naphthylamine.

17. A method according to claim 16, wherein the naphthylamine is α-naphthylamine.

18. A method according to claim 16, wherein the napthylamine is β-napthylamine.

19. A sparingly soluble salt of cephalexin with a base selected from the group consisting of a compound of the formula

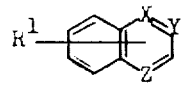

wherein $R^1$ represents hydrogen, hydroxyl, methyl or ethyl, each of X, Y and Z represents nitrogen or carbon and at least one of X, y and Z is nitrogen, with the proviso that all of X, Y and Z do not represent nitrogen at the same time, and a compound of the formula

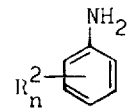

wherein $R^2$ represents chlorine or alkyl of 1 to 3 carbon atoms and n is an integer or 1 or 2, or $R_n^2$ represents the group —CH=CH—CH=CH—.

20. A salt according to claim 19, wherein the base is selected from the group consisting of quinoline, isoquinoline and naphthylamine.

21. The salt according to claim 20, wherein the base is quinoline.

* * * * *